(12) United States Patent
Kajikuri et al.

(10) Patent No.: US 7,578,602 B2
(45) Date of Patent: Aug. 25, 2009

(54) LASER IRRADIATION SYSTEM

(75) Inventors: Junichi Kajikuri, Kanagawa (JP); Tamio Mori, Kanagawa (JP); Hideki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 11/194,678

(22) Filed: Aug. 2, 2005

(65) Prior Publication Data

US 2006/0070278 A1   Apr. 6, 2006

(30) Foreign Application Priority Data

Aug. 3, 2004   (JP) ............... P2004-226895

(51) Int. Cl.
  *G02B 27/20*   (2006.01)
(52) U.S. Cl. .................. 362/259; 362/553; 362/558
(58) Field of Classification Search ............. 362/119, 362/120, 202, 205, 259, 553, 555, 558, 565, 362/577, 511, 414, 431, 433; 33/DIG. 21; 372/108; 385/88–94, 103, 901
See application file for complete search history.

(56) References Cited

U.S. PATENT DOCUMENTS

| | | | |
|---|---|---|---|
| 4,733,332 A | | 3/1988 | Yamashita et al. |
| 4,744,615 A | * | 5/1988 | Fan et al. ............ 385/146 |
| 5,335,150 A | | 8/1994 | Huang |
| 5,897,200 A | * | 4/1999 | Ho ....................... 362/259 |
| 5,980,063 A | * | 11/1999 | Ford et al. ............. 362/186 |
| 6,160,948 A | * | 12/2000 | McGaffigan ............ 385/146 |
| 6,318,875 B1 | * | 11/2001 | Hrabar et al. ........... 362/119 |
| 6,519,401 B1 | * | 2/2003 | Imamura et al. ........ 385/123 |
| 6,554,464 B1 | * | 4/2003 | Hawryluk et al. ....... 362/582 |
| 7,021,809 B2 | * | 4/2006 | Iwasa et al. ............ 362/555 |
| 7,254,300 B2 | * | 8/2007 | Nishie et al. ............ 385/49 |
| 7,292,749 B2 | * | 11/2007 | Gluckstad et al. ....... 385/28 |
| 7,327,916 B2 | * | 2/2008 | Tanaka .................. 385/31 |
| 7,359,601 B2 | * | 4/2008 | Loeb ..................... 385/117 |
| 2002/0131471 A1 | * | 9/2002 | Sugiyama ............... 372/108 |
| 2004/0090783 A1 | * | 5/2004 | Chang et al. ............ 362/293 |
| 2004/0213317 A1 | * | 10/2004 | Hashimoto et al. ...... 372/102 |
| 2004/0228143 A1 | * | 11/2004 | Squicciarini ............ 362/555 |
| 2005/0013328 A1 | * | 1/2005 | Jurgensen ............... 372/6 |

FOREIGN PATENT DOCUMENTS

| | | | |
|---|---|---|---|
| JP | 63210904 A | * | 9/1988 |
| JP | 2004-20604 | | 1/2004 |

* cited by examiner

*Primary Examiner*—Jong-Suk (James) Lee
*Assistant Examiner*—Leah S Lovell
(74) *Attorney, Agent, or Firm*—Finnegan, Henderson, Farabow, Garrett & Dunner, L.L.P.

(57) ABSTRACT

A laser irradiation system includes a laser diode as a laser generation source, a lens for receiving the laser light introduced thereto from the laser diode and producing a laser beam, and a light pipe for receiving the laser beam produced by the lens and introduced thereto, wherein the light pipe has a hollow portion for guiding the introduced laser beam for irradiation therewith, and an outer tube portion for emitting light by scattering the introduced laser beam, whereby the irradiation with laser being conducted can be clearly indicated so that the user can easily notice the situation even in the cases of unintended irradiation with laser.

9 Claims, 5 Drawing Sheets

LASER IRRADIATION SYSTEM

BACKGROUND OF THE INVENTION

The present invention relates to a laser irradiation system for displaying characters or figures by irradiating an external member with a laser beam.

Laser pointers for indicating an objective body by a laser beam in a lecture, a lecture meeting and the like have been manufactured and sold (see, for example, Japanese Patent Laid-open No. 2004-20604). At present, portable laser applied apparatuses including such a laser pointer are designated as products to be regulated by the consumer livelihood product safety regulation, and it is a duty for the manufacturers to manufacture products which conform to the technical standards.

As the technical standards, a variety of items have been determined from the viewpoint of safety, and one of the items is that "the product should have a function for enabling the user to check that the product is being supplied with electric current". In short, it is a duty for the manufacturers to add to the products a function of indicating that irradiation with laser is being performed.

In view of the above, the laser pointers in the past have been provided with a light emitting diode (LED) which emits light during irradiation with laser, whereby the function of indicating that irradiation with laser is under way has been realized.

SUMMARY OF THE INVENTION

For certain, the above-mentioned LED does function as an indicator for indicating that irradiation with laser is under way. However, as a result of investigations of whether the LED indicator in practical use can clearly inform the user of the fact that irradiation is under way, there have been found some cases where the simple light emission from the LED is insufficient. For example, unintended irradiation with laser may be continued due to an erroneous operation, and, in such a case, the simple light emission from the LED alone may fail to permit the user to notice the situation. Therefore, for coping with such a case, it may be necessary to clearly show the user that the irradiation with laser is being conducted.

In addition, simple provision of the LED alone may fail to give an anesthetic appeal.

Thus, there is a need for providing a laser irradiation system capable of clearly indicating that irradiation with laser is under way, for the user to easily notice the situation even in the case of unintended irradiation with laser.

In order to fulfill the need, according to an embodiment of the present invention, there is provided a laser irradiation system for displaying characters or figures by irradiating an external target with a laser beam. The laser irradiation system includes: a laser generation source; a lens for receiving laser light from the laser generation source and producing the laser beam; and a light pipe for receiving the laser beam produced by the lens and introduced thereto. The light pipe has: a hollow portion for guiding the introduced laser beam for irradiating the target with the laser beam; and an outer tube portion for light emission through scattering of the introduced laser beam.

In a preferable embodiment of the present invention, the inside surface of the outer tube portion is a rough surface.

In addition, in another embodiment of the present invention, the outer tube portion is formed of a light-transmitting resin containing a light scattering agent.

According to the laser irradiation system of the present invention, it is possible to clearly indicating that irradiation with laser is under way, for the user to easily notice the situation even in the case of unintended irradiation with laser.

DETAILED DESCRIPTION OF THE PREFERRED EMBODIMENTS

First Embodiment

Figure 1:
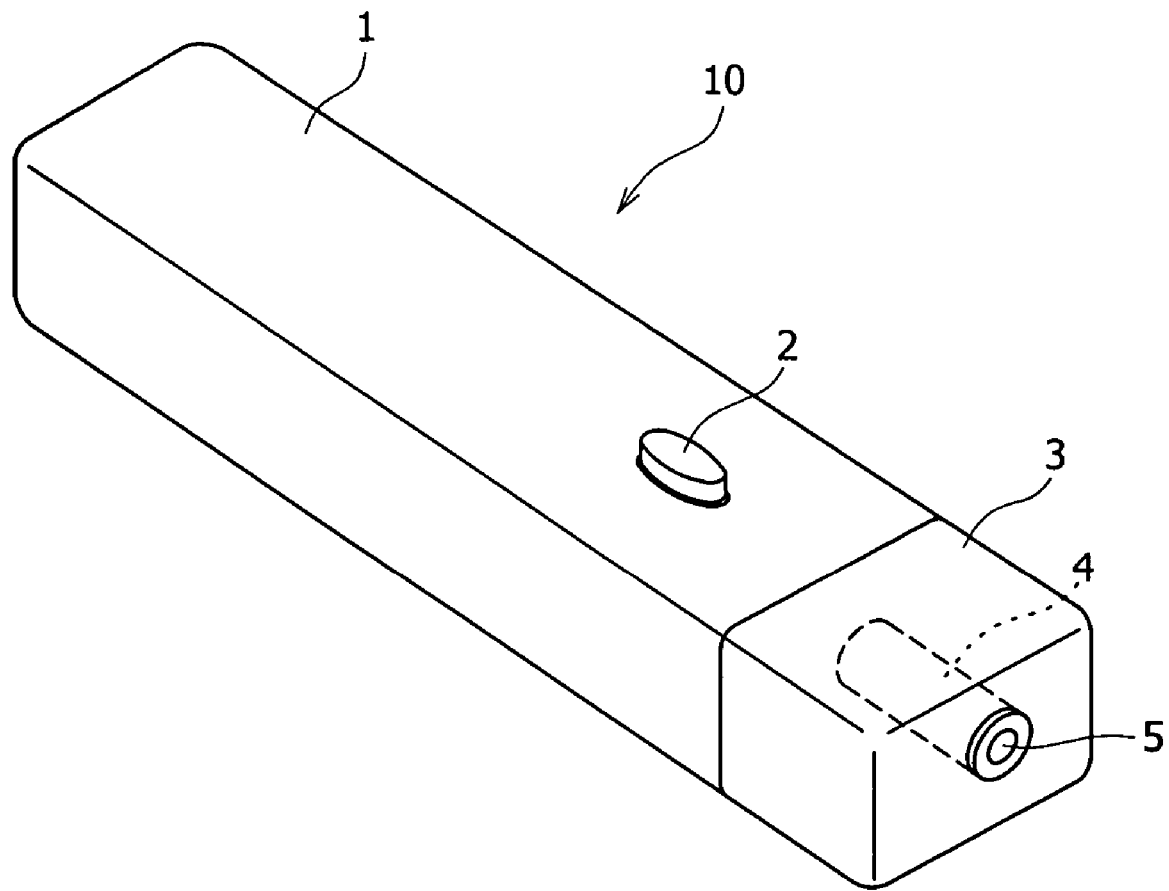
FIG. 1 is a perspective view showing the appearance of a laser pointer in an embodiment of the present invention.

Now, preferred embodiments of the present invention will be describe in detail below referring to the drawings. Here, a laser pointer for indicating an object body (target) in a lecture, a lecture meeting or the like by a laser beam will be described as an embodiment; however, the present invention is not limited to the laser pointer, and is applicable generally to laser irradiation systems for displaying characters or figures by irradiating an external target with a laser beam.

FIG. 1 is a perspective view showing the appearance of a laser pointer 10 according to this embodiment. The laser pointer 10 in this embodiment has a main body portion case 1 formed in a roughly elongate rectangular parallelopiped shape. The main body portion case 1 is formed of a plastic or the like material, and a laser irradiation button 2 is formed on the surface thereof. The main body portion case 1 incorporates therein a laser module for radiating a laser beam, and a cell or battery for driving the laser module.

In addition, a light pipe 4 as a light waveguide formed of a light-transmitting resin or the like member is provided at a surface, on the right lower side in the figure, of the main body portion case 1. Symbol 5 denotes an end portion of the light pipe 4, which serves as an irradiation port for irradiation with the laser beam. Symbol 3 denotes a transparent acrylic resin-made cover member formed in a rectangular parallelopiped shape for protecting the light pipe 4.

Figure 2:
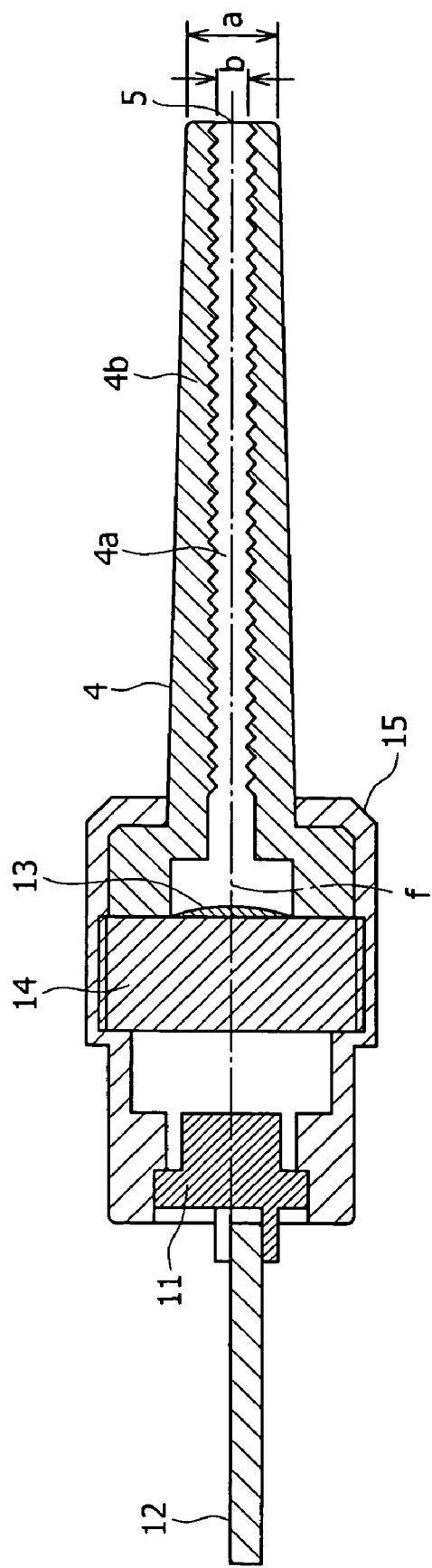
FIG. 2 is a sectional view showing the structures of a laser module and a light pipe which are incorporated in a laser pointer according to a first embodiment of the present invention.

FIG. 2 is a sectional view showing the structure of the laser module and the light pipe which are incorporated in the main body portion case 1.

In the figure, symbol 11 denotes a laser diode as a laser generation source. The laser diode 11 is wired to a drive circuit substrate 12, and is fixed by a sleeve 15. The laser emitted from the laser diode 11 conforms to the standard based on the consumer livelihood product safety regulation; for example, a visible ray red semiconductor laser with a wavelength of 650 nm and an output of less than 1 mW (based on Class II of JIS).

A lens 13 is disposed on the optical path, on the right side in the figure, of the laser diode 11. Specifically, the lens 13 functions as a collimator lens for producing a roughly parallel laser beam from the laser light coming from the laser diode 11 and being incident thereon. The lens 13 is held by a lens holder 14, and the lens holder 14 is fixed to the sleeve 15.

Besides, the light pipe 4 is fixed on the optical path, on the right side in the figure, of the lens 13 by, for example, being clamped between the lens holder 14 and the sleeve 15. The light pipe 4 is a hollow-structured light waveguide for receiving the laser beam introduced thereto from the lens 13, and the optical axis f of the laser beam penetrates through the hollow portion 4a. In other words, the hollow portion 4a plays the role of a guide by which the laser beam introduced from the lens 13 is guided to the external target for irradiating the target therewith.

Most of the laser beam projected rightwards in the figure from the lens 13 penetrates through the hollow portion 4a of the light pipe 4 along the optical axis f thereof, and goes out through the irradiation port 5. The outgoing laser beam is made to irradiate the external target therewith, whereby predetermined characters or figures are displayed.

Meanwhile, the outer tube portion 4b of the light pipe 4 serving as a light waveguide is formed of a light-transmitting resin or the like as above-mentioned, and it functions as a light emitting portion for emitting light by scattering the introduced laser beam there. In this embodiment, for example, as shown in FIG. 2, the inside surface of the outer tube portion 4b is made to be a rough surface for scattering the laser beam. Besides, in this case it is desirable that the diameter of the lens 13 is set equal to or greater than the outside diameter a of the light pipe 4, for giving the laser energy to not only the hollow portion 4a but also the outer tube portion 4b.

This configuration ensures that a part of the laser beam projected rightwards in the figure from the lens 13 is scattered according to the inclination angles of multiplicities of projected portions and recessed portions constituting the rough surface, or the inside surface of the light pipe 4, and the scattered light leaks to the exterior, so that the light pipe 4 itself emits light. Then, the light-emitting light pipe 4 can be used as an indicator for indicating that irradiation with the laser beam is being conducted. Accordingly, there is no need for an LED, which has been used for this purpose in the related art. Besides, in this case, light emission can be effected over the length of the light pipe 4, so that the light emission area is very large as compared with that in the case where only one LED is provided as in the related art. This ensures that the irradiation with laser being conducted can be clearly indicated to the user so as to make it possible to cope with the cases where unintended irradiation with laser is continued due to an erroneous operation.

In addition, when the quantity of the scattered light leaking to the exterior is regulated according to the degree of roughness of the rough surface, or the inside surface of the light pipe 4, it is possible to obtain a light emission condition with an anesthetically peculiar effect (for example, a feeling of softness).

The degree of roughness of the rough surface which gives the above-mentioned effect differs according to the specifications of the laser diode 11 and the material, shape and the like of the light pipe 4. It has been empirically confirmed that, in the case where the outside diameter a of the light pipe 4 at the irradiation port for radiating the laser beam is about 4 mm and the inside diameter (the diameter of the hollow portion 4a) b is about 2 mm, good results can be obtained when the height or depth of the projected portions and the recessed portions is about 5 to 10 μm.

Such a rough surface can be realized, for example, by a method in which, in the case of molding the light pipe, an etching processing is applied to the inside surface of the light pipe after the molding and during when the light pipe is half cured and the inside surface is thereby provided with a rugged form. Or, the rugged shape may be obtained by cutting the inside surface of the light pipe by use of a jig for cutting.

Second Embodiment

Figure 3:
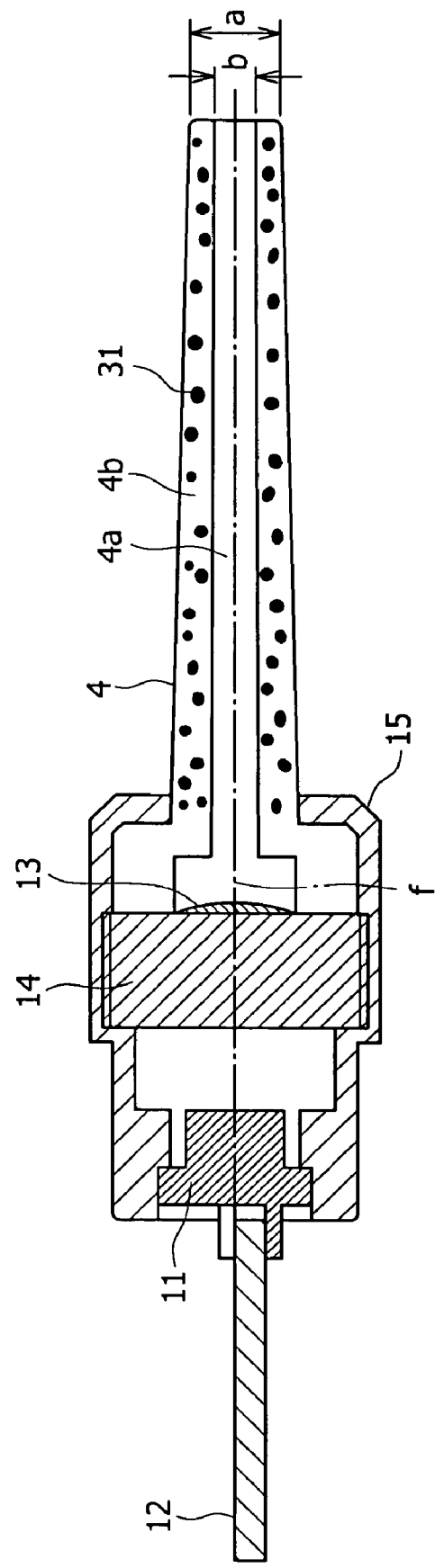
FIG. 3 is a sectional view showing the structure of a light pipe in a second embodiment of the present invention.

FIG. 3 shows, as a second embodiment, an exemplary configuration in which a light pipe 4 is formed by use of a light-transmitting resin containing a light scattering agent, in place of processing the inside surface of the light pipe 4 into a rough surface. Symbol 31 in the figure denotes the light scattering agent. As the light scattering agent, for example, aluminum flakes can be used. Laser energy is given also to an outer tube portion 4b in this configuration. As a result, a part of the laser beam incident on the light pipe 4 is discharged to the exterior of the light pipe 4 while being scattered by the light scattering agent 31.

This configuration eliminates the need to process the inside surface of the light pipe 4 into a rough surface.

In addition, for obtaining effective light emission, it may be contemplated to combine the first embodiment and the second embodiment. Namely, there may be adopted a configuration in which the light pipe 4 is formed by use of a light-transmitting resin containing a light scattering agent and the inside surface of the light pipe 4 is processed to be a rough surface.

Third Embodiment

In the above-described embodiments, the laser light is scattered in order to obtain effective light emission, by processing the inside surface of the light pipe into a rough surface (first embodiment) or by forming the light pipe by use of a resin containing a light scattering agent such as aluminum flakes (second embodiment). As a third embodiment, there may be adopted a configuration in which the light pipe 4 is formed of a pigment-containing resin, and the diameter of the lens 13 is set to be not less than the outside diameter a of the light pipe, so as to give the laser energy to not only the hollow portion 4a but also the outer tube portion 4b. It has been empirically confirmed that such a configuration can provide effective light emission from the light pipe. The third embodiment is advantageous in that it is unnecessary to process the inside surface of the light pipe into a rough surface or to use a resin containing a light scattering agent.

Fourth Embodiment

In the following embodiments, some modification examples as to the treatment of the surroundings of a laser irradiation port 5 in a laser pointer 10 will be shown.

Figure 4:
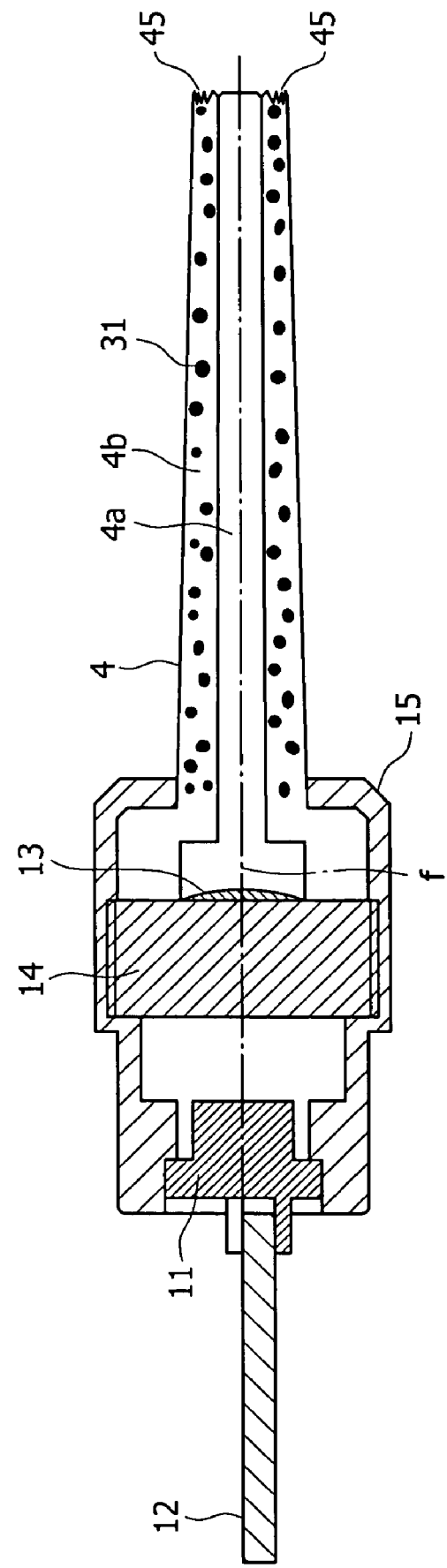
FIG. 4 is a sectional view showing the structure of a light pipe in a fourth embodiment of the present invention.

In order to obtain effective light emission at the light pipe 4, the laser energy is given also to the outer tube portion 4b of the light pipe 4, as has been described above. However, all the laser given to the outer tube portion 4b does not undergo scattering or the like inside the light pipe 4, and the laser is radiated also from the end face of the outer tube portion 4b, which may cause the generation of ghost in the vicinity of the target being irradiated with laser. This problem can be solved by processing the end face 45, on the laser outgoing side, of the outer tube portion 4b into a rough surface as shown in FIG. 4. This ensures that the laser emitted from the end face 45 can be scattered. Incidentally, FIG. 4 shows an example of application of the fourth embodiment to the light pipe containing the light scattering agent shown in FIG. 3 according to the second embodiment, and the fourth embodiment can naturally be applied to other embodiment forms, for example, the light pipe shown in FIG. 1.

Fifth Embodiment

A laser irradiation port 5 is preferably in a closed structure. In each of FIGS. 2 to 4, the irradiation port 5 has a closed structure. Of course, the irradiation port 5 may be kept open, but the structure in which the irradiation port 5 is closed is for preventing dust from being accumulated in the irradiation port 5 with the result of the generation of unscheduled unnecessary scattering of the laser light or deterioration of the appearance. Incidentally, as the means for closing the irradiation port 5, for example, a cover member 3 may be so mounted that the inside surface, opposed to the irradiation port 5, of the cover member 3 abuts on the irradiation port 5. Alternatively, the irradiation port 5 may be closed directly by use of a transparent acrylic resin plate for exclusive use.

Other than the above, the irradiation port 5 may be closed with a lens. With the lens provided at the irradiation port 5, it is possible to compensate for the laser beam convergence loss arising from the dispersion of the laser beam convergence performance depending on the quality of a laser diode 11.

Sixth Embodiment

While the light pipe 4 is so mounted that the optical axis f of the laser beam penetrates through the hollow portion 4b as above-mentioned, it may be necessary to pay attention to the mounting accuracy of the light pipe 4. If the mounting accuracy of the light pipe 4 is low, the inside wall of the light pipe 4 interferes with the optical axis f, and the resulting reflected light may generate ghost in the vicinity of the target being irradiated with laser.

In order to obviate the generation of ghost, it is desirable for the light pipe 4 to have such a structure that the direction of the light pipe 4 can be regulated at the time of mounting the light pipe 4.

Figure 5:
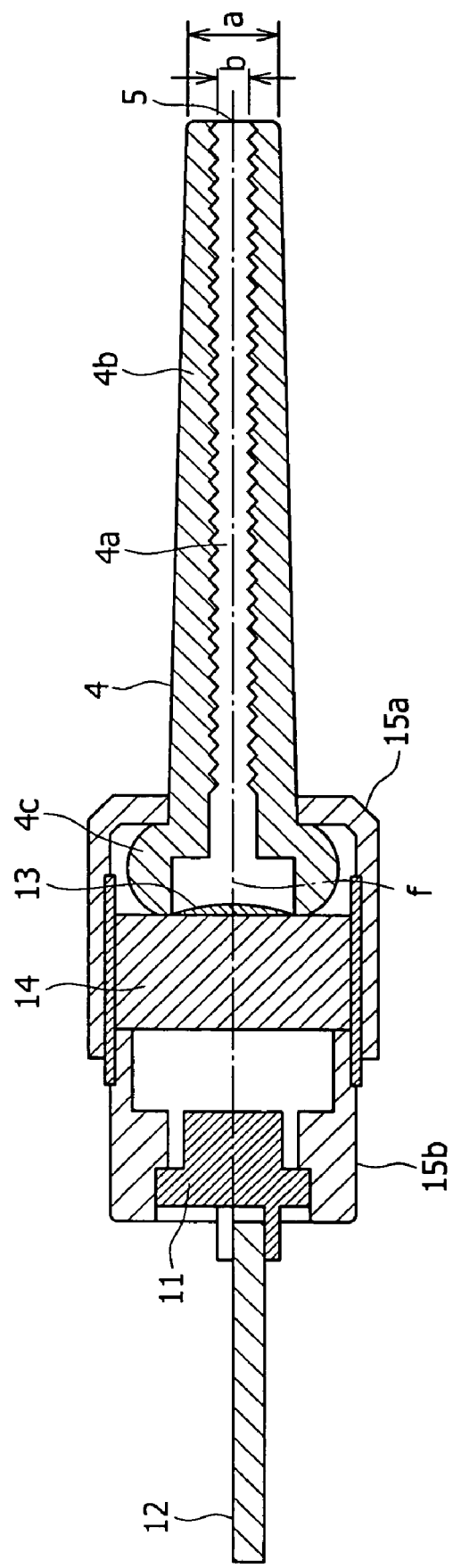
FIG. 5 is a sectional view showing the structure of a light pipe in a sixth embodiment of the present invention.

FIG. 5 shows an exemplary configuration of a light pipe whose axial direction can be regulated, in this embodiment. This example is based on an improvement of the mounting portion of the light pipe 4 shown in FIG. 2, and can be applied also to the light pipes configured as shown in FIGS. 3 and 4.

In FIG. 5, the light pipe 4 and a lens holder 14 are fixed by a sleeve 15a, whereas a laser diode 11 is fixed by a sleeve 15b different from the sleeve 15a. Here, the lens holder 14 and the sleeve 15a are respectively threaded, and the sleeve 15b is also threaded in the same manner as the lens holder 14. The lens holder 14 and the sleeve 15b are fixed in the state of screw engagement with the sleeve 15a.

Besides, symbol 4c denotes a mounting portion of the light pipe 4. The mounting portion 4c is fixed in the state of being clamped between the lens holder 14 and the inner wall of the sleeve 15a. Specifically, as the lens holder 14 and the sleeve 15b are gradually screwed into the inside of the sleeve 15a, the mounting portion 4c is fastened and fixed in the state of being clamped between the lens holder 14 and the inner wall of the sleeve 15a. Here, the mounting portion 4c in this embodiment is smaller than the inside diameter of the sleeve 15a and has a rounded shape, as shown in the figure. Therefore, adjustment of the axis of the light pipe 4 can be easily carried out while regulating the extent of screwing-in of the lens holder 14 and the sleeve 15b.

According to the above-mentioned configurations, the axis of the light pipe 4 and the optical axis f can be coincided with each other by regulating the axis of the light pipe 4. As a result of this, it is possible to prevent the generation of ghost of laser.

It should be understood by those skilled in the art that various modifications, combinations, sub-combinations and alterations may occur depending on design requirements and other factors insofar as they are within the scope of the appended claims or the equivalents thereof.

What is claimed is:

1. A laser irradiation system for irradiating an external target, comprising:
    a laser generation source;
    a lens for receiving laser light from the laser generation source and producing a laser beam;
    a lens holder for holding the lens;
    a light pipe for receiving the laser beam, the light pipe including a hollow portion for guiding a first portion of the laser beam for irradiating the target, and an outer tube portion for scattering a second portion of the laser beam;
    a first sleeve for supporting the lens holder and the light pipe;
    a second sleeve for supporting the laser generation source, the second sleeve being different from the first sleeve; and
    a mounting portion for mounting the light pipe, the mounting portion being fixed between the lens holder and an inner wall of the first sleeve.

2. The laser irradiation system as set forth in claim 1, wherein an inside surface of the outer tube portion is a rough surface.

3. The laser irradiation system as set forth in claim 2, wherein the outer tube portion comprises a light-transmitting resin containing a light scattering agent.

4. The laser irradiation system as set forth in claim 2, wherein the outer tube portion comprises a light-transmitting resin containing a pigment.

5. The laser irradiation system as set forth in claim 1, wherein the outer tube portion comprises a light-transmitting resin and a light scattering agent.

6. The laser irradiation system as set forth in claim 1, wherein the outer tube portion comprises a light-transmitting resin and a pigment.

7. The laser irradiation system as set forth in claim 1, wherein the light pipe is mounted such that an axis thereof can be adjusted.

8. The lens irradiation system as set forth in claim 1, wherein an end face on a laser beam outgoing side of the outer tube portion is a rough surface.

9. The lens irradiation system as set forth in claim 1, wherein the scattered second portion of the laser beam indicates operation of the laser generation source.

* * * * *